United States Patent [19]

Long

[11] 3,934,898

[45] Jan. 27, 1976

[54] PASSENGER RESTRAINT DEVICE

[76] Inventor: John C. Long, 90 Broad St., Charleston, S.C. 29401

[22] Filed: Mar. 10, 1975

[21] Appl. No.: 557,092

[52] U.S. Cl. .............................. 280/150 B; 297/390
[51] Int. Cl.² ......................................... B60R 21/10
[58] Field of Search ................ 280/150 B; 297/390; 296/63

[56] References Cited
UNITED STATES PATENTS

| | | | |
|---|---|---|---|
| 2,245,899 | 6/1941 | Campbell | 280/150 B |
| 2,674,486 | 4/1954 | Alderfer | 296/63 |
| 2,805,081 | 8/1957 | Frimet | 280/150 B |
| 2,919,140 | 12/1959 | West | 280/150 B |
| 3,165,333 | 1/1965 | Dalgleish | 280/150 B |

Primary Examiner—M. H. Wood, Jr.
Assistant Examiner—Michael J. Forman
Attorney, Agent, or Firm—Strauch, Nolan, Neale, Nies & Kurz

[57] ABSTRACT

A passenger restraint device for an automotive vehicle wherein one end of a passenger restraint arm is pivoted on a member slidably displaceable along the door, a motion transmitting strap interconnects the restraint arm and another member slidable along the door, and the members carry latching and locking elements that are automatically connected in operative relation when the arm has been swung away from the door into passenger restraint position. The latch is manually releasable by the passenger.

11 Claims, 12 Drawing Figures

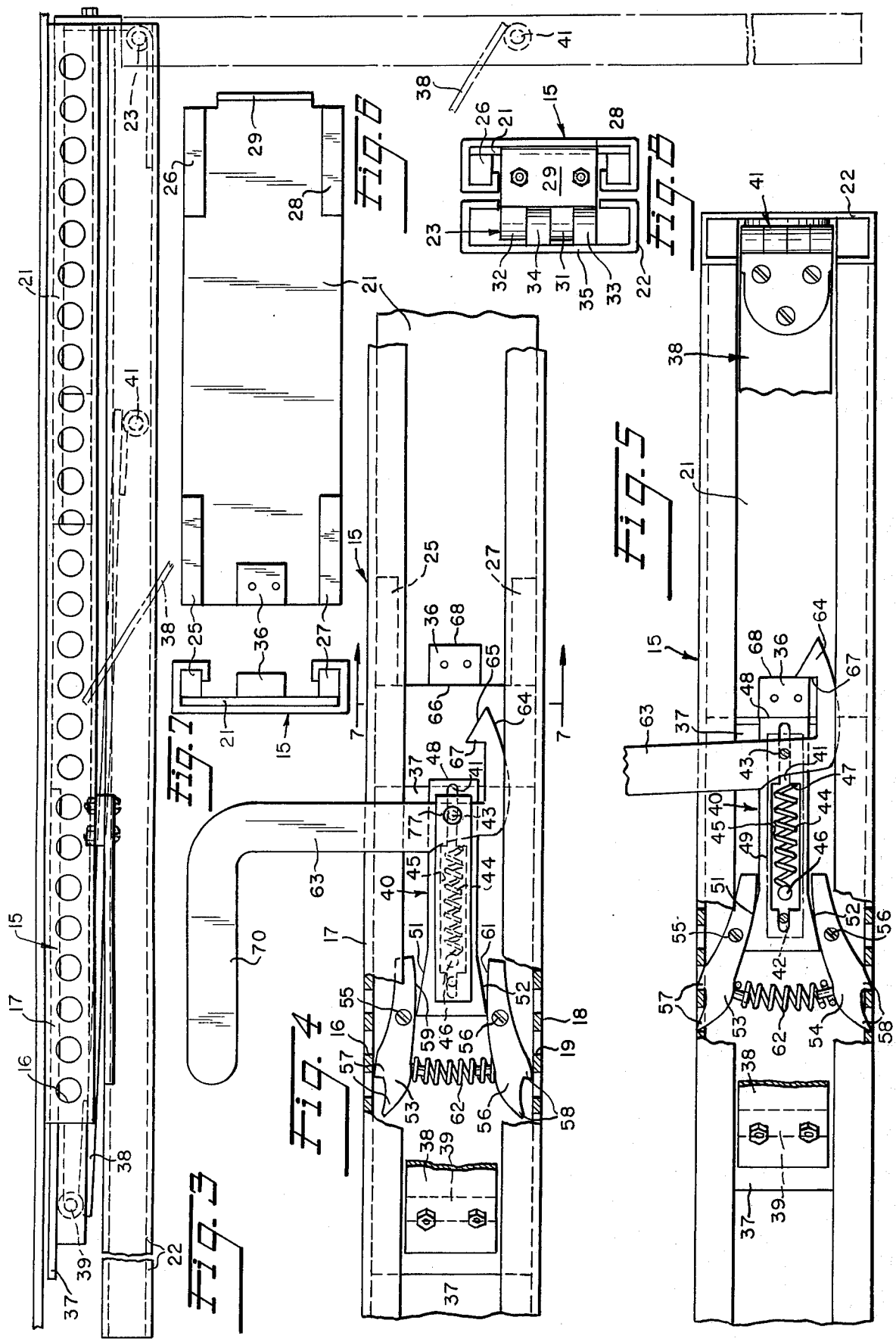

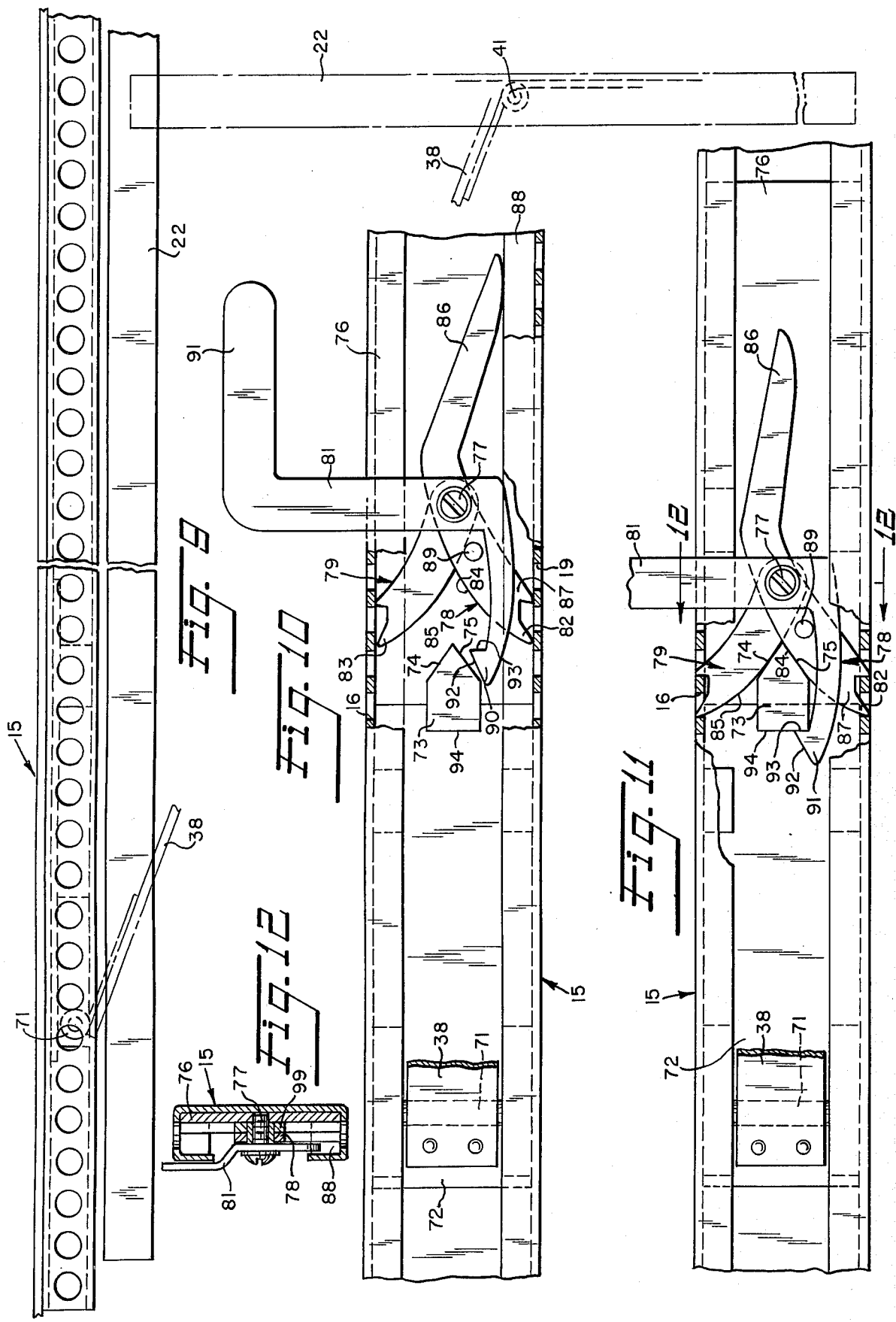

PASSENGER RESTRAINT DEVICE

Passenger vehicles sold today are required to be equipped with passenger restraint devices of some form. That which is most common is the flexible type wherein strap or belt sections extend across the waist and/or shoulder and are buckled together. In many of these flexible restraints at least one section is wound on a spring reel and the free end of the section lies loosely in the vehicle where it is difficult to locate and may even be trapped under the door ledge, and unless the proper length is pulled out of the reel at first, the whole process must be started over again. Also many have short fixed sections difficult to find, especially in the dark, and acrobatics are required to find the free end and match the buckle part on it to the buckle on the other section. Moreover these flexible belts are often too confining and become very uncomfortable especially on long trips.

The present invention is directed to a more comfortable and more readily usable passenger restraint wherein a restraining arm is pivoted at one end on the door at the passenger side and swingable between an inoperative position extending along the door to operative association with the passenger, arrangement being made for automatically locking the arm in the restraint position from which it may be released only by deliberate manual unlatching operation on the part of the passenger, and this is the major object of the invention.

A further object of the invention is to provide a novel passenger restraint device wherein a passenger restraint arm is pivotally connected to two relatively slidable latch bearing elements on the door in such arrangement that the arm may be adjusted along the door to suit different passenger sizes and when the arm is swung away from the door relative displacement of the latch bearing elements into latch condition is effected as the restraint arm becomes operatively associated with the passenger.

Further and more specific objects of the invention include novel locking and latching mechanisms actuated by movement of the passenger restraint arm to association with the seated passenger.

Restraint devices involving door mounted arms swingable across the passenger have been proposed as disclosed in U.S. Pat. Nos. 2,245,899 to Campbell, Alderfer, 2,674,486; Frimet, 2,805,081; Dalgleish, 3,165,333 and Presunka 3,198,544. These are mainly complex and expensive. The restraint device of the invention is relatively simple structurally, less expensive and easier for the passenger to operate, and this is an important object of the invention.

Other objects of the invention will become apparent from the ensuing description of preferred embodiments, the appended claims and the accompanying drawings.

BRIEF DESCRIPTION OF THE DRAWINGS

FIG. 3 is a fragmentary top plan view showing detail;

FIG. 4 is a fragmentary side elevation showing the latch mechanism in disengaged condition;

FIG. 5 is a fragmentary side elevation similar to FIG. 4 but showing the latch mechanism engaged;

FIG. 6 is a side elevation of the arm mounting slide apart from the assembly showing detail;

FIG. 7 is a section substantially on line 7—7 of FIG. 4 showing detail;

FIG. 8 is an end view of the device of FIGS. 1 and 2 in folded condition;

FIG. 9 is a top plan view similar to FIG. 3 but showing a different embodiment;

FIG. 10 and FIG. 11 are fragmentary side elevations showing the latching mechanism of FIG. 9 in disengaged and engaged condition respectively, and FIG. 12 is a section substantially on line 12—12 of FIG. 11.

PREFERRED EMBODIMENTS

Figure 1:
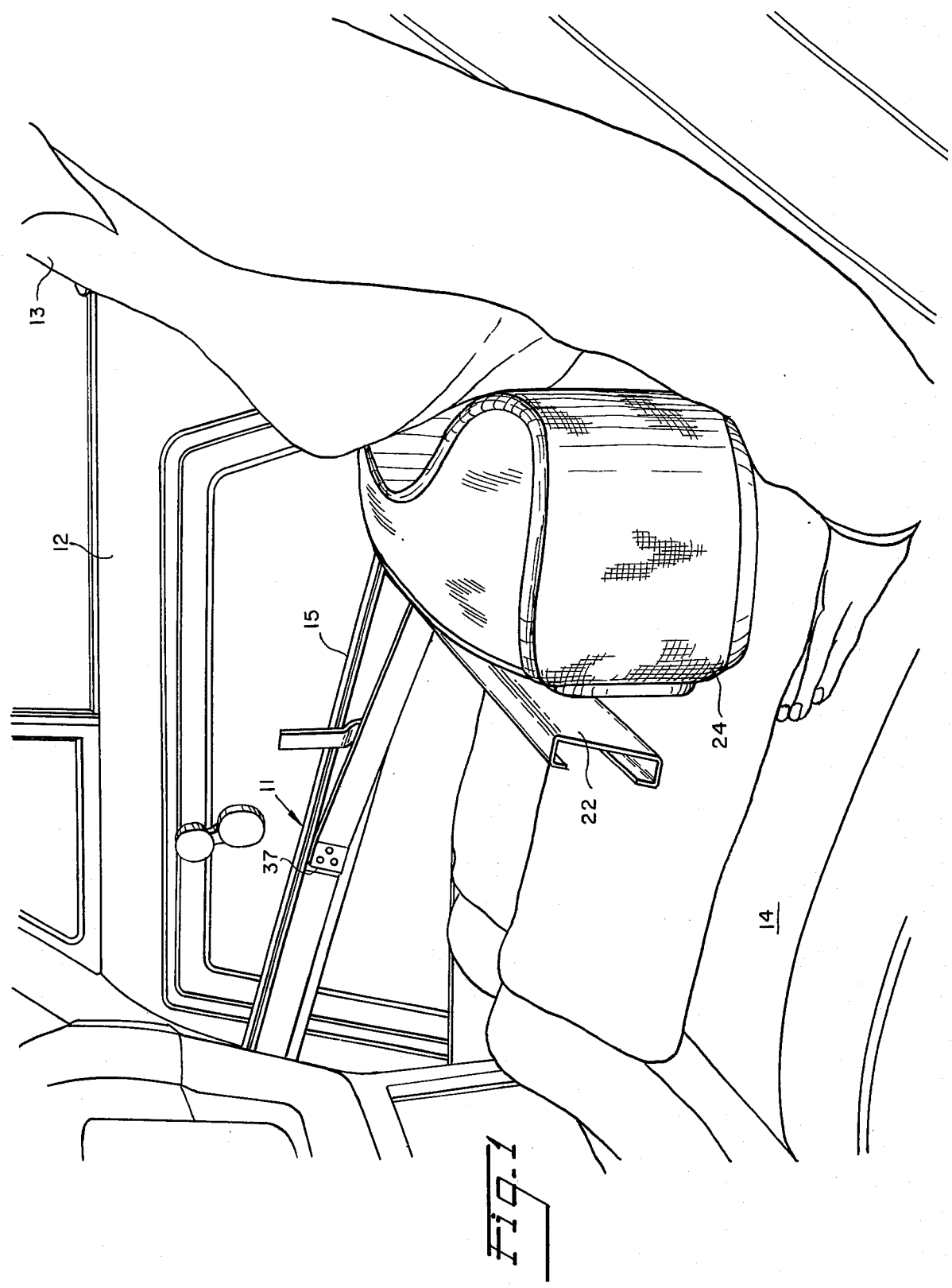
FIG. 1 is a generally perspective view illustrating a structural embodiment of the invention in passenger restraining condition.

Referring to FIGS. 1–5, the passenger restraint device 11 is mounted on the inside of the right hand front door 12 of a automobile the hinged edge of the door being at the left in FIG. 1 so that when it opens it swings back out of the plane of the drawing. A passenger 13 is shown normally seated on the front seat 14.

Figure 2:
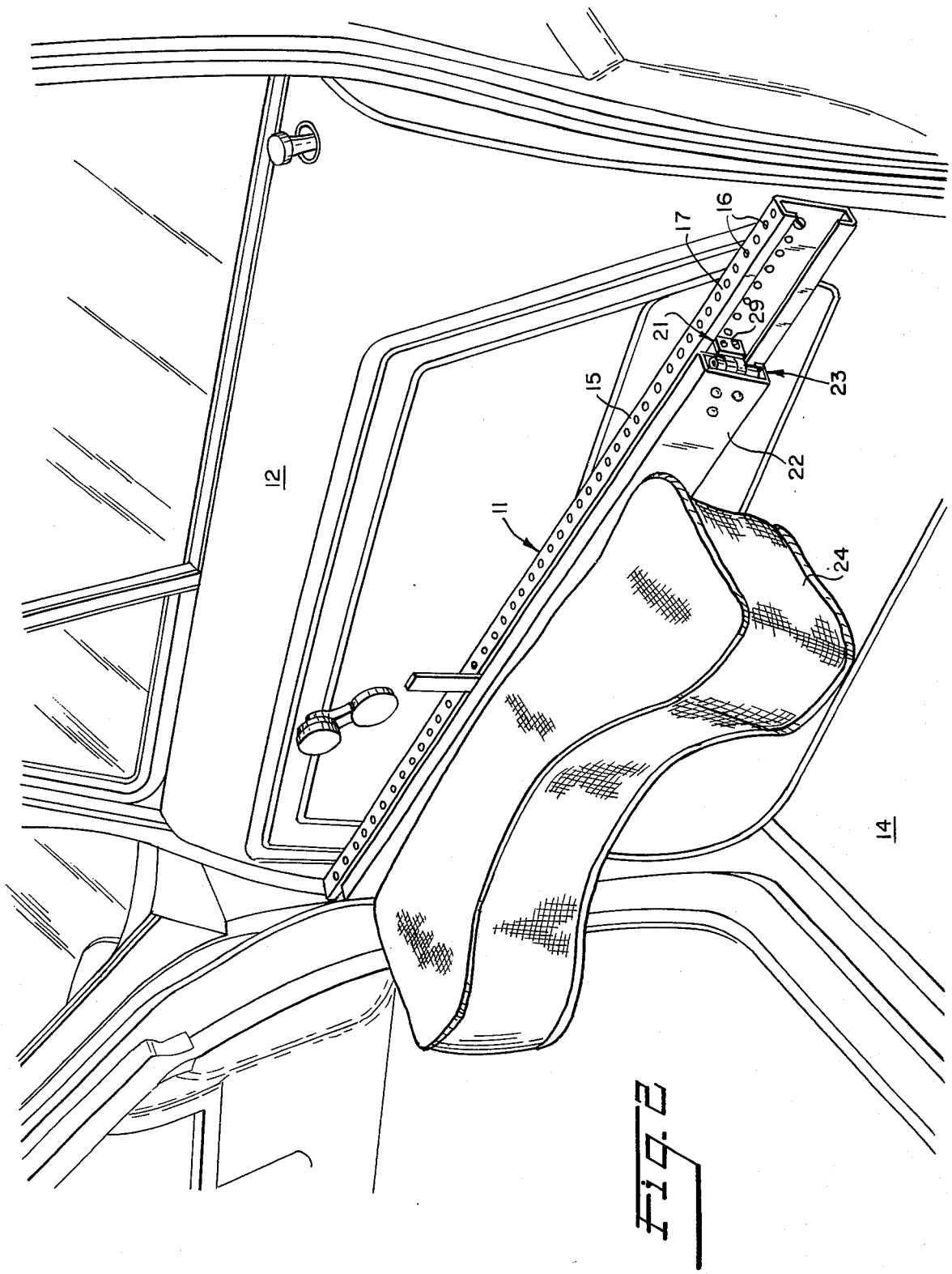
FIG. 2 is a generally perspective view showing the device of FIG. 1 in folded condition at the door.

In this embodiment, the restraint device 11 is mounted on a rigid bar 15 positively fixed along the inner side of door 12 by suitable fasteners (not shown) that coact with structural frame elements of the door. It will be noted, as shown in FIGS. 1 and 2, that bar 15 extends generally longitudinally of the vehicle and is inclinded slightly upwardly toward the hinged edge of the door. This angular disposition has been found to adapt the invention to readily suit different sizes of passengers. It also contributes to ease of operation as well as increased comfort of the passenger.

While the bar 15 is illustrated as externally secured across the inner side of the door it will be understood that in certain refinements it may be recessed within the inner surface for appearance and folding away during non-use.

Bar 15 is a U-shaped channel with its open side facing the interior of the vehicle. A linear series of equally spaced openings 16 is provided along the upper leg 17 of the channel for a purpose to appear. A similar linear series of equally spaced openings 19 is provided along the lower leg 18 of the channel. Legs 17 and 18 are parallel.

A slide plate member 21 is longitudinally slidably mounted in the channel, and at the end of member 21 remote from the door hinge a passenger engaging restraint arm assembly 22 is pivoted, as by the generally vertical hinge 23, for movement between the passenger restraining position of FIG. 1 where it projects substantially at right angles from the door and the inoperative position of FIG. 2 where it is folded. A cushion pad 24 preferably contoured to the human form is mounted on arm assembly 22.

Referring to FIGS. 4–8, the plate member 21 is generally rectangular with four guide blocks 25–28 fixed on opposite corners for smooth sliding in channel 15. At its hinged end plate 21 is turned outwardly at right angles to provide a lug 29 mounting hinge loops 31 and 32 that interfit with hinge loops 33 and 34 on a plate 35 fixed upon arm 22 as shown in FIG. 8. A rectangular latch block 36 is fixed on the end of plate 21 remote from hinge 23.

A second slide plate member 37 is slidably mounted in channel 15. Plate 37 has corner slide blocks like blocks 25–28 like plate 21 for fitting with channel 15.

A flat relatively stiff flat metal strap 38 is pivoted at one end at 39 to plate 37 and at its other end at 41 to arm 22. FIG. 3 illustrates the slidable displacement of plate 37 along channel 15 as the arm 22 swings about pivot 23 and moves from its folded solid line position to the chain line extended position.

Plate 37 carries latch mechanism coacting with channel openings 16 and 19 to hold arm 22 in restraint position. A cam member 40 extends centrally longitudinally of plate 37 and has a central longitudinally slot 41 through the ends of which extend guide posts 42 and 43 fixed in spaced relation on plate 37. The slot ends are of such width as to have only sliding clearance with the guide posts so that cam member 40 is capable of limited sliding movement relative to plate 37. A compression spring 44 disposed in a wide section 45 of slot 41 extends between an anchor 46 fixed to plate 37 and a shoulder 47 on cam 40, so that the cam member is biased to the right in FIGS. 4 and 5, and the small end of cam member has an end abutment surface 48 beyond the adjacent edge of plate 37 for a purpose to appear. Preferably a fixed cover 49 extends over the spring and slot with its opposite ends mounted on the guide posts, and the guide posts may be screws extending through holes in cover 49 and the slot ends to be threaded into plate 37.

At its other end cam member 40 is formed with inclined similar cam surfaces 51 and 52 that oppositely diverge toward the channel legs. Similar locking pawls 53 and 54 swingable on fixed intermediate pivots 55 and 56 on plate 37 have one or more teeth 57 and 58 respectively at their ends adapted to coact with the channel leg openings, and have cam follower surfaces 59 and 61 shaped to coact with cam surfaces 51 and 52 respectively. A compression spring 62 extends between the pawls to bias them toward toothed engagement with the channel legs.

A latch member 63 is pivoted on guide post 43 and extends therebelow and longitudinally to terminate in a latching tip 64 having an inclined cam surface 65 adapted to coact with the lower corner of flat abutment face 66 on block 36 and a flat latch face 67 that is adapted to coact with flat latch face 68 on block 36. Latch faces 66 and 68 are parallel and parallel to abutment face 48 of cam member 40.

In operation, starting with the parts as shown in FIG. 2, the passenger is seated and rocks the arm 22 about pivot 23 toward the restraint condition of FIG. 1. Since the device must fit to many different girths and sizes the passenger by means of the leverage of arm 22 usually first slides the plate 21 along channel 15 until the pivot 23 is satisfactorily longitudinally located along the channel and then completes rocking the arm 22 about pivot 23.

As arm 22 rocks about pivot 23 (counterclockwise in FIG. 3) plate 21 and the pivot 23 will remain fairly fixed and strap 38 will pull plate 37 slidably along channel 15 toward plate 21. During this movement of plate 37 the oppositely biased locking pawls 53 and 54 will be held in the non-locking position of FIG. 4 by the enlarged cam and between them, and to ensure this condition the teeth 57 and 58 are shaped to ratchet over the channel leg openings during this movement.

At the time that the arm 22 reaches its restraint position, plate 37 has moved to the point where abutment face 48 of the cam engages the relatively stationary face 66 of latch block 36, and further movement of the plate 37 results in displacement of cam member 40 to the left in FIG. 4 relative to plate 37 thereby permitting spring 62 to rock pawls 53 and 54 into engagement with the channel legs where teeth 57 and 58 enter the openings 16 and 19 as shown in FIG. 5. Should both plates 21 and 37 now slide together a small distance to the right in FIG. 5 due to the pulling force on arm 22, the teeth 57 and 58 will merely ratchet to new locking positions and the pivot 23 will be repositioned finally.

As plate 37 is moving toward plate 21 as above described, the latch lever 63 which is normally biased as by the weight of its handle at 70 or springs (not shown) to the position shown in FIG. 4 is rocked clockwise by engagement of inclined face 65 with the lower edge of latch block face 66 and after tip 64 passes below latch block 36 the biasing weight or spring will rock the lever 63 counterclockwise to dispose face 67 in contact with latch block face 68 as shown in FIG. 5, thereby latching the parts in position against accidental release of the restraint.

When it is desired to release the restraint the passenger rocks lever 63 clockwise in FIG. 5, thereby permitting spring 44 to displace the cam 40 to the right and cam the pawls 53 and 54 out of locking engagement with the openings in the channel legs and then the passenger swings arm 22 to the folded non-restraint condition of FIG. 2.

Referring to FIGS. 9–12 another form of latching is shown. Certain similarly numbered parts are the same as in FIGS. 1–8. The strap 38 which is hinged at one end at 41 to arm 22 is hinged at 71 to a forward slide plate 72 in channel 15 and an abutment block 73 is centrally fixed on the rear end of plate 72 to provide rearwardly projecting diverging faces 74 and 75.

A second slide plate 76 is mounted rearwardly in the channel, and arm 22 is hinged to the rear end thereof in the same manner as it is hinged to plate 21 at 23.

Slide plate 72 and 76 have corner guide blocks affixed thereto for slidably fitting in channel 15 similarly to plates 21 and 37 of FIGS. 1–8.

At the forward end of slide plate 76 is a fixed pivot post 77 on which are freely pivotally mounted pawls 78 and 79 and a latch lever 81. Pawls 78 and 79 are formed with teeth 82 and 83 respectively engageable in the channel leg openings 16 and 19, and with oppositely inclined surfaces 84 and 85 that are adapted to engage the abutment block surfaces 75 and 74 during operation as will appear.

As illustrated pawl 78 is provided with a rear tail portion 86 of such weight with respect to the tooth bearing front portion 87 that pawl 78 is biased to rock clockwise by gravity to the FIG. 10 position, and a guide block 88 fixed on plate 72 is the same manner that block 28 is fixed on plate 21 limits this movement so that normally pawl 78 seeks the non-restraint inoperative position of FIG. 10 with teeth 82 out of engagement with the channel leg openings 19.

Pawl 79 is biased to rock counterclockwise by gravity but movement in that direction is limited by engagement with a pin 89 projecting laterally from pawl 78, so that is assumes the inoperative non-restraint position of FIG. 10 with teeth 83 out of engagement with channel leg openings 16.

The lever 81 is biased by weighted handle portion 91 to rock clockwise in FIGS. 10 and 11, and at its lower end it extends longitudinally to provide a latching tip 90 having an inclined cam surface 92 and a flat latch face 93. Clockwise rotation of lever 81 is limited as by engagement with pin 89, so that it normally assumes the position shown in FIG. 10.

When it is desired to move the parts to restraint position the seated passenger rocks arm 22 away from the door and slides plate 76 in channel 15 to locate pivot 23 as in the first embodiment. Then continued movement of arm 22 into engagement with the passenger results in strap 38 pulling slide 72 rearwardly until the cam faces 74 and 75 of block 73 engage the pawls and rock them oppositely to the tooth locking condition of FIG. 11. During this time cam face 92 of the lever 81 has engaged block 73 to thereby rock the lever counterclockwise until the latch tip clears block 73, and then lever 81 rocks clockwise until latch face 93 engages behind flat abutment face 94 on block 73. Thus holds the parts in restraint position.

To release from arm 22, the passenger lifts handle 91 to unlatch lever 81 from block 73, and swings arm 22 back into the door, whereupon the pawls and lever 81 all reassume the FIG. 10 position.

In both embodiments the restraint bar 22 is quickly and efficiently swung from an inoperative position substantially flush with the door through about 90° to restraint position, the final movement effecting automatic positive locking and latching in restraint position. No unsightly or annoying loose belt ends or catches requiring acrobatic manouvering are necessary.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. Passenger restraint apparatus for a vehicle having a side door comprising a restraint arm, mounting means on said door pivoting one end of said arm for movement between an inoperative position extending along the door and an angularly related position for restraining a seated passenger, said mounting means being adjustable along the door to conform the restraint to different passenger sizes, means at the door automatically responsive to movement of said arm to said restraint position for releaseably latching said arm in restraint position, and manual means for releasing the latched arm.

2. The apparatus defined in claim 1, comprising latch element carrying members slidably mounted on said door for movement toward and away from each other, one of said members having means whereby said one end of the arm is pivotally mounted thereon and means is provided connecting said arm to the other of said members whereby pivotal movement of said arm displaces said other latch element carrying member toward the positioned member on which the arm is pivoted.

3. The apparatus defined in claim 1 comprising slide guide means on said door, separate latch element carrying members slidable in said guide means, said mounting means comprising means pivotally connecting said one end of said restraint arm to one of said latch element carrying members, and a motion transmitting member interconnecting said arm and the other of said latch element carrying members whereby movement of said arm away from the door causes movement of said other latch element carrying member toward said one latch carrying member.

4. The apparatus defined in claim 3, wherein said motion transmitting member is a relatively stiff member pivoted at opposite ends to said arm and to said one latch element carrying member.

5. The apparatus defined in claim 3, wherein said latching means comprises a pivoted latch lever on one latch element carrying member adapted to coact with a fixed abutment on the other latch element carrying member, and said manual means comprises a handle on said lever accessible to a seated passenger.

6. The apparatus defined in claim 3, wherein at least one locking element is pivoted on one of said latch carrying members so as to be rockable between an active position wherein it has ratchet toothed connection to said slide guide means and an inactive position, and cam means on one of said latch carrying members is adapted to positively displace said locking element to operative position when said latch element carrying members come together as the arm reaches restraint position.

7. The apparatus defined in claim 6, wherein said locking element and cam means are on different latch element carrying members.

8. The apparatus defined in claim 6, wherein said locking element is a toothed pawl and said slide guide means is formed with recesses coacting with said pawl.

9. The apparatus defined in claim 6, wherein said locking element and cam means are on the same latch element carrying member.

10. The apparatus defined in claim 6, wherein there are two locking elements pivoted on parallel adjacent or the same axis and said cam means is adapted to oppositely rock them when said latch element carrying members come together.

11. The apparatus defined in claim 10, wherein said latching means comprises an abutment and a coacting pivoted latch lever on the respective latch element carrying members and said cam means is on said abutment.

* * * * *